United States Patent Office 2,891,989
Patented June 23, 1959

2,891,989

DI(ACID MALEATES) OF 2,2'-[ISOPROPYLIDENE BIS(p-PHENYLENEOXY)]-DIALKANOLS

John F. Petras, Glen Rock, N.J., assignor to United States Rubber Company, New York, N.Y., a corporation of New Jersey No Drawing. Application November 16, 1956
Serial No. 622,520

3 Claims. (Cl. 260—485)

The invention comprises new compositions of matter, namely, the di(acid maleates) of 2,2'-[isopropylidenebis (p-phenyleneoxy)]dialkanols represented by the formula HOOC—CH=CH—$\overset{\text{O}}{\underset{\|}{\text{C}}}$—O—CH$_2$$\overset{\text{R}}{\underset{|}{\text{CH}}}$O— 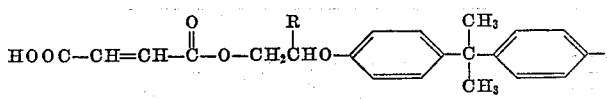—$\overset{\text{CH}_3}{\underset{\overset{|}{\text{CH}_3}}{\text{C}}}$— 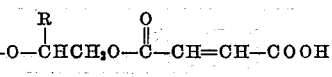—O—$\overset{\text{R}}{\underset{|}{\text{CH}}}$CH$_2$O—$\overset{\text{O}}{\underset{\|}{\text{C}}}$—CH=CH—COOH where R is hydrogen or an alkyl group of from 1 to 4 carbon atoms.

These new compounds are copolymerizable monomers and (like the unsaturated polyesters described in the Carleton Ellis U.S. Patents No. 2,255,313, dated September 9, 1941, and No. 2,195,362, dated March 26, 1940) they can be copolymerized in combination with various reactive monomers, such as vinyltoluene, vinyl acetate, 2-methyl-5-vinyl-pyridine, methyl methacrylate, diallyl phthalate, triallyl cyanurate, N-vinylphthalimide, diallyl benzenephosphonate, etc., to give useful plastics. However, in contradistinction to the conventional unsaturated polyesters covered by the Ellis U.S. Patents Nos. 2,255,313 and 2,195,362, the new monomers of this invention have a number of important advantages. specifically, when copolymerized with styrene in mixtures containing 30–70% styrene, the following properties result (in comparison with conventional unsaturated polyester-styrene mixtures):

(1) Higher heat distortion temperature
(2) Greater chemical resistance
(3) Greater resistance to discoloration on exposure to light.

These advantages of the new copolymerizable monomers of this invention are the result of several important differences in their chemical makeup as compared with conventional copolymerizable unsaturated polyesters:

(1) The new monomers of this invention are prepared from substantially two mols unsaturated dicarboxylic acid or anhydride per mol dihydroxy compound, resulting in definite chemical compounds of relatively low molecular weight. The conventional unsaturated copolymerizable polyesters, i.e., those covered by the Ellis U.S. Patents Nos. 2,255,313 and 2,195,362, in contrast are prepared by reacting substantially one mol of unsaturated dicarboxylic acid per mol of dihydroxy compound, so that there results a mixture of chemical species with a broad molecular weight distribution and relatively high average molecular weight.

(2) The new monomers of this invention are so prepared that the unsaturation in the compound occurs in definite, known positions at the ends of the molecular chain, rather than dispersed at random throughout the molecule, as in the case of conventional copolymerizable unsaturated polyesters. Localization of the unsaturation at the chain ends in this way usually results in superior physical properties in copolymers, because of the high degree of structural regularity thus obtained. The new monomers are definite chemical compounds of known (not random) structure.

(3) Conventional unsaturated polyesters have units held together by ester linkages entirely. The new copolymerizable monomers of this invention contain a considerable proportion of chemically stable phenyl ether linkages with resulting advantages in chemical, heat, and light resistance.

Maleic acid may be used in making the new copolymerizable monomers of this invention, but maleic anhydride is preferred. The anhydride is the full chemical equivalent of the acid, and in addition reacts much more rapidly and at a lower temperature than the acid.

The invention is illustrated by the following examples, parts being by weight.

EXAMPLE 1

A reactor of one liter capacity was charged with 316 g. (1 mol) of 2,2'-[isopropylidenebis(p-phenyleneoxy)] diethanol of melting point 112° C.–114° C., and 216 g. (2.2 mols) of maleic anhydride. The mixture was heated slowly until the components melted together, whereupon an exothermic reaction occurred, raising the temperature to 120° C.–130° C. The heating was then renewed to bring the batch temperature up to 150° C. and hold temperature at 150° C. for one hour. At the end of this time the acid number had dropped to 245 from 465 for the unreacted mixture. Acid number calculated for 100% reaction was 254. Reaction to form the di(acid maleate) of 2,2'-[isopropylidenebis(p-phenyleneoxy)]diethanol therefore had proceeded substantially to completion. Molecular weight determination gave 460 compared to calculated 522.

The product was cooled to 100° C. and stabilized by the addition of 100 parts per million of p-tertiary-butyl-catechol. Storage stability of at least one year at 75° F. was thus obtained. When cooled to 75° F. the product was a glassy, hard yellow solid which could be pulverized in a mortar.

The monomer as prepared above was copolymerized with styrene, using percentages of styrene varying from 30% to 60% at 10% intervals. The polymerization catalyst used was a paste of equal weights of benzoyl peroxide and tricresyl phosphate. Cure was 15 hours at 55° C. followed by 1 hour at 110° C. Hard, transparent plastics were obtained with physical properties as listed in Table I. Between the limits of styrene content used, exceptionally high heat distortion temperature was noted.

Table I.—*Physical properties of copolymers of styrene with the di(acid maleate) of Example 1*

| Composition: | | | | |
|---|---|---|---|---|
| Di(Acid Maleate) Monomer | 70 | 60 | 50 | 40 |
| Styrene | 30 | 40 | 50 | 60 |
| 50% Benzoyl Peroxide Paste | 4 | 4 | 4 | 4 |

Cured 15 hours at 55° C. plus 1 hour at 110° C.

| Properties: | | | | |
|---|---|---|---|---|
| Rockwell R. Hardness | 119 | 128 | 127 | 127 |
| Tensile Strength, p.s.i. | 4,440 | 4,911 | 3,690 | 2,650 |
| Elongation, percent | 8 | 8 | 8 | 12 |
| Modulus×10$^{-3}$, p.s.i.— | | | | |
| 25° C | 531 | 578 | 521 | 427 |
| 50° C |  | 466 | 447 | 454 |
| 75° C |  | 357 | 357 | 374 |
| 100° C | 62 | 207 | 208 | 194 |
| 125° C |  | 15 | 20 | 8.0 |
| 150° C |  | 2.7 | 2.3 | 2.3 |
| Izod Notched Impact Strength, ft.-lb. per inch of notch | 0.27 | 0.39 | 0.34 | 0.31 |
| Heat Distortion Temperature, °C | 98 | 113 | 113 | 109 | while other properties were comparable to or better than those of a commercial general purpose unsaturated polyester-styrene copolymer.

EXAMPLE 2

A reactor of five liters capacity was charged with 2268 gm. (5 mols) of 2,2'-[isopropylidenebis(p-phenyleneoxy)]dipropanol, the commercial form used being "Dow Resin 565." The charge was heated to 100° C. with stirring and the source of the heat removed while 1293 gm. (13.2 mols) of maleic anhydride were added. Reaction started immediately, the heat evolved being sufficient to raise the temperature of the mixture to 120° C.–130° C. After the reaction moderated, heat was again applied and the mixture kept at 150° C. for one hour. At the end of this period the acid number had dropped to 233 from 416 for the unreacted mixture. Acid number calculated for 100% reaction was 241. Reaction to form the di(acid maleate) of 2,2'-[isopropylidenebis(p-phenyleneoxy)]dipropanol therefore had proceeded substantially to completion.

The product was cooled to 100° C. and stabilized by the addition of 100 parts per million of p-tertiary-butylcatechol. Storage stability of at least one year at 75° F. was thus obtained. When cooled to 75° F. the product was a hard, glassy solid, which could be pulverized by grinding.

The monomer as prepared above was copolymerized with styrene, using percentages of styrene varying from 20% to 90% at 10% intervals. Polymerization catalyst used was a paste of benzoyl peroxide (50% in tricresyl phosphate). Hard, transparent plastics were obtained with physical properties as listed in Table II. Between the limits of 30% and 80% styrene, exceptionally high heat distortion temperature was noted, while other properties were comparable to or better than those of a commercial general purpose unsaturated polyester-styrene copolymer. Therefore, 30% to 80% styrene is the preferred range of styrene content in the use of this monomer.

*Table II.—Properties of styrene copolymers with the di (acid maleate) of Example 2*

| | | | | | | | | |
|---|---|---|---|---|---|---|---|---|
| Monomer acid (parts by weight) | 80 | 70 | 60 | 50 | 40 | 30 | 20 | 10 |
| Styrene (parts by weight) | 20 | 30 | 40 | 50 | 60 | 70 | 80 | 90 |
| 50% Benzoyl Peroxide Paste (parts by weight) | 4 | 4 | 4 | 4 | 4 | 4 | 4 | 4 |

Cured 15 hours at 55° C. plus 1 hour at 110° C.

| | | | | | | | | |
|---|---|---|---|---|---|---|---|---|
| Physical Properties: | | | | | | | | |
| Rockwell R. Hardness | 127 | 126 | 123 | 126 | 125 | 127 | 127 | 127 |
| Tensile, p.s.i. | 3,500 | 4,600 | 4,800 | 6,100 | 5,100 | 4,600 | 3,100 | 1,500 |
| Elongation, percent | 8 | 8 | 8 | 10 | 10 | 10 | 8 | 4 |
| Modulus $\times 10^{-3}$, p.s.i.— | | | | | | | | |
| 25° C | 480 | 530 | 400 | 440 | 450 | 440 | 420 | 370 |
| 50° C | | 470 | 320 | 390 | 390 | | | |
| 75° C | | 320 | 360 | 310 | 350 | | | |
| 100° C | 3.1 | 53 | 123 | 174 | 204 | 180 | 41 | 2.0 |
| 125° C | | 1.6 | 5.1 | 12 | 5.3 | | | |
| 150° C | | 1.1 | 1.4 | 1.5 | 1.2 | | | |
| Notched Izod Impact Strength (ft.-lb. per inch of notch) | 0.21 | 0.22 | 0.29 | 0.23 | 0.30 | 0.37 | 0.22 | 0.14 |
| Heat Distortion Temperature, °C | | 96 | 102 | 108 | 112 | 109 | | |

NOTE.—Elongations in Table I and Table II were calculated from jaw separation and are therefore highet than true absolute values. For example, an elongation of 8% corresponds to an A.S.T.M. elongation of abour 1.3% to 1.5%.

Having thus described my invention, what I claim and desire to protect by Letters Patent is:

1. As new compositions, the di(acid maleates) of 2,2'-[isopropylidenebis(p-phenyleneoxy)]dialkanols represented by the formula

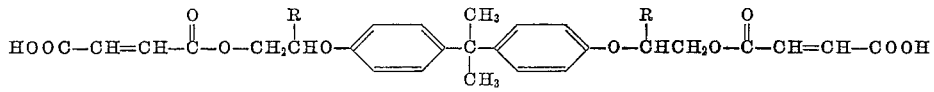

where R is a member from the class consisting of hydrogen, and an alkyl group of from 1 to 4 carbon atoms.

2. The di(acid maleates) of 2,2'-[isopropylidenebis(p-phenyleneoxy)]diethanol.

3. The di(acid maleates) of 2,2'-[isopropylidenebis(p-phenyleneoxy)]dipropanol.

References Cited in the file of this patent

UNITED STATES PATENTS

| | | |
|---|---|---|
| 2,359,622 | Coleman et al. | Oct. 3, 1944 |
| 2,634,251 | Kass | Apr. 7, 1953 |
| 2,652,419 | DeGroote | Sept. 15, 1953 |